United States Patent Office 3,810,864
Patented May 14, 1974

3,810,864
TRANSLUCENT POLYVINYLCHLORIDE PLASTIC COMPOSITION AND METHOD FOR PREPARING SAME
Edward L. White, R.D. N-3, Freehold, N.J. 07728; Joseph Schwarcz, 1204 Grant Ave., Plainfield, N.J. 07060; and William D. Lang, 523 Lower Alden Drive, Rahway, N.J. 07065
No Drawing. Original application June 1, 1971, Ser. No. 149,021, now Patent No. 3,740,245. Divided and this application Dec. 27, 1972, Ser. No. 318,773
Int. Cl. C08f 45/04; C09d 5/18
U.S. Cl. 260—45.75 R                   2 Claims

ABSTRACT OF THE DISCLOSURE

This invention relates to an improved substantially translucent plastic composition having enhanced flame retardancy prepared by adding to a plastic composition a new composition of matter prepared by reacting antimony trioxide or an antimony trioxide generating compound with a substrate comprising hydrous silica or a hydrous alkali or alkaline earth metal silicate in a weight ratio in the range of from 1:4 to 1:1 on an antimony trioxide:substrate basis, the reaction being carried out by calcining an admixture of said compounds at a temperature within the range of from 400° C. to 550° C. in an oxygen containing atmosphere.

---

This is a division of pending application, Ser. No. 149,021, filed June 1, 1971, now U.S. Pat. No. 3,740,245.

BACKGROUND OF THE INVENTION

Antimony trioxide has been known for its value as a flame retardant additive for paints and plastics. However, the use of antimony trioxide has several disadvantages. Variations in particle size an purity have been found to introduce variations in the flame retardancy characteristics and undesirable fluctuations in opacity from batch to batch. And while the relatively high index of refraction of antimony trioxide may be no detriment in the preparation of flame retardant paints, antimony trioxide has often proved inappropriate for those applications where it is desired to produce a substantially translucent plastic material. Moreover, the tendency for antimony trioxide to impart opacity as well as different degrees of tinting strength to plastic materials is especially undesirable when colors are to be used, the variations in tinting strength seriously interfering with the true color desired in the plastic. And further, the cost of antimony trioxide for use as an effective flame retardant in plastics is relatively high.

Efforts to overcome the disadvantages inherent in the use of antimony trioxide include the utilization of phosphorous compounds and while these have been effective in producing relatively translucent plastics the phosphates are not only expensive but may have a deleterious effect on the stability of the plastic. U.S. Pat. No. 3,560,441 describes another expedient for insuring improved translucency and uniform color in plastics wherein antimony trioxide is mixed with a compound of boron and fused to form a boron-glass which is ground to a preferred particle size and then used as an additive in plastics for imparting flame retardancy and low smoke characteristics thereto. However, this process has the disadvantages attending a relatively high temperature operation requisite to the formation of a glass melt, followed by quenching to produce a glass frit and subsequent grinding to reduce the frit to a prescribed particle size.

As mentioned above antimony trioxide has been used as a flame retardant in paints and U.S. Pat. No. 2,882,178 discloses an improvement wherein the antimony trioxide is coated on a substrate of particulate silica. While this material compares favorably with antimony trioxide as a flame retardant additive nevertheless the antimony coated silica is relatively abrasive and hence causes excessive wear of processing equipment attended by the inclusion of metallic contaminants in the final product thus causing marked graying in the end product.

SUMMARY OF THE INVENTION

It has now been found, quite unexpectedly, that by reacting a trivalent compound of antimony with a substrate such as hydrous silica, or a hydrous alkali or alkaline earth metal silicate, sometimes referred to hereinafter and in the claims as hydrous compounds of silicon, in a weight ratio range of from 1:4 to 1:1 on an antimony trioxide: substrate basis, at a critical temperature in the range of from 400° C. to 550° C. and in an oxygen containing atmosphere the reaction product will be a particulate solid, which is non-abrasive and which is compatible with an constitutes a highly efficient flame retardant additive in plastics. This particulate material may be characterized as a composition of matter comprising an amorphous material, with the possible inclusion of crystalline fractions, with a specific gravity in the range of 2.4 to 3.6, an antimony trioxide content of from about 15 to 55% and an index of refraction in the range of from 1.5 to 1.7. In this connection it was found that the particle size and the inclusion of crystalline fractions in the reaction product depend largely on the nature of the substrate while the specific gravity depends primarily on the nature of the substrate and the concentration of antimony in the reaction product. On the other hand, the index of refraction of the reaction product is governed by the indices of refraction of both the antimony oxide and the substrate.

Of the compounds of antimony that may be used in producing the flame retardant material of this invention antimony trioxide is preferred but other compounds of antimony, including the metal, are contemplated within the scope of the invention including for example organic salts of antimony such as antimony tartrate, antimony potassium tartrate and antimony triacetate; and inorganic salts of antimony such as antimony sulfide. It is noteworthy, however, that antimony tetraoxide does not provide a satisfactory reaction product.

Concerning the substrates it is essential that these be hydrous silicas or silicates. Included among the hydrous silicas which react readily with the aforementioned compounds of antimony are "hydrate silica," as represented by the formula $SiO_2 \cdot nH_2O$; hydrosols, silica gels, collodial silica, precipitated silica or polysilicic acid such as orthosilicic acid or metasilicic acid. Each of the above mentioned hydrous silicas is characterized by at least one silanol or silane diol group and hence is capable of reacting readily with a compound on antimony. On the other hand, non-hydrous silicas such as $SiO_2$, quartz, and the like, which contain no chemically combined water, are non-reactive and hence unsuitable.

In addition to the aforementioned hydrous silicas the invention also contemplates the use of hydrous silicates, as for example the hydrous silicates of alkali metals and the akaline earth metals such as potassium silicate and the hydrous silicates of calcium, magnesium, barium and strontium, an especially effective hydrous metal silicate being hydrous magnesium silicate or talc.

The antimony-containing inorganic composition of matter of this invention is highly effective as a flame retardant additive when used in plastics or resinous coating systems and in particular those plastics in which halogen is present in the structure of the polymer or present in the form of an additive such as chlorinated hydrocarbon; typical resin systems being polyvinylchloride (PVC), epoxy, polyesters, rubber and the like.

While the method of mixing the compounds may vary widely, as will be appreciated by those skilled in the art, two methods in particular have been used, the one being by dry blending the compounds in the proper proportions followed by calcining the blended compounds within the critical temperature range specified above and for a predetermined time, followed by screening; the other method being a so-called wet method wherein the compounds are added to water to form an aqueous slurry which is filtered and the recovered solids dried, calcined, comminuted to break up agglomerates, and subsequently screened. In this connection it should be emphasized that the reaction product is formed without fusion and hence any agglomerates present in the calcined material may be readily comminuted without intensive milling.

Irrespective of which method is employed the reaction product of this invention is a non-abrasive, relatively finely divided particulate solid having a specific gravity in the range of from 2.4 to 3.6 and an index of refraction in the range of from 1.5 to 1.7 as a consequence of which the reaction product exhibits minimal opacity and tinting strength in most plastics. Moreover, the reaction product is wholly or partially amorphous, that is to say all or a portion of the reaction product has not identifiable X-ray diffraction pattern. Whether or not the reaction product will be wholly amorphous or will comprise an amorphous material plus a crystalline fraction depends upon the type of hydrous silica or silicate used. Thus, if a relatively pure, amorphous hydrous silica is used, as for example polysilicic acid, then the reaction product will be substantially amorphous when produced in accordance with the process limitations of this invention. On the other hand, if a hydrous metal silicate is used as for example a commercial talc which includes crystalline components together with impurities then the final product will include the impurities, the crystalline components, crystalline oxide reaction products and/or oxidation products, etc.

PREFERRED EMBODIMENT OF THE INVENTION

As mentioned above, the invention may be carried out in any one of several ways using antimony trioxide or antimony trioxide generating compounds and hydrous silicas or silicates; and the reaction products so formed will have substantially the same properties so far as being an effective, non-abrasive, flame retardant additive. It has been found, however, that the particle size of the hydrous silica or silicate does control to some extent the particle size of the reaction product, and this may constitute a factor to be considered in assessing the preferred embodiment of the invention. More particularly, where the flame retardant additive of this invention is to be used in flame proofing fibers and the like, then it is desirable to produce material of fine particle size. On the other hand, if the flame retardant additive is to be used in paper where retention is an important factor then a coarser material may be more desirable.

Specifically, a reaction product comprising a substantially white, non-abrasive particulate solid having excellent flame retardancy and exhibiting exceptionally low tinting strength in polyvinyl chloride plastic materials may be prepared by calcining a dry or wet blend of antimony trioxide and a fine particle size (0.02 micron) hydrous calcium silicate, wherein the weight ratio of antimony trioxide ($Sb_2O_3$) to the hydrous calcium silicate (ca. 3 $SiO \cdot nHO$) is about 1:3 on an anhydrous basis, and calcination of the mixture is carried out in the presence of air for about 2 hours at a temperature of about 475° C.

While a weight ratio of antimony trioxide to hydrous calcium silicate of about 1:3 on an anhydrous basis has consistently produced satisfactory reaction products the concentration of antimony trioxide may be reduced to as low as about 15% or may be increased to as high as 55%. However, concentrations of antimony trioxide below 15% leave excessive unreacted substrate in the final product such that when used as a flame retardant additive in plastics flame retardancy will be less efficient; while at concentrations above 55% an appreciable amount of the tetraoxide of antimony will be formed which is conducive both to formation of an abrasive material and when used as an additive in plastics, produces high tinting strength and opacity. Also, while a calcination temperature of about 475° C. is preferred, temperatures as low as 400° C. to as high as 550° C. may be used. However, temperatures below 400° C. will not produce a completely reacted product while temperatures above 550° C. tend to produce a gray, abrasive material. In general, residence times at calcination temperatures within the above mentioned range are not critical and may vary from one half up to 48 hours with little effect on the reaction product provided however the weight ratios of the compounds used are within the ranges set out above. However, if there is a relatively large excess of one or the other of the compounds present in the mix, then over-extended calcination periods may produce oxides or other products detrimental to the avowed uses of the reaction product. Another factor which has been found to be critical to the production of the non-abrasive particulate solid of this invention is the atmosphere in which components are reacted during calcination. Experience has demonstrated that an oxygen-containing atmosphere e.g. air must be used and that an inert or reducing atmosphere must be avoided.

As an alternative source of a hydrous metal silicate and one which has a somewhat larger particle size than hydrous calcium silicate is hydrous magnesium silicate or talc. Of the several commercially available talcs, two materials identified as platey California talc and fibrous Montana talc, respectively, have been found to form reaction products with antimony trioxide which are non-abrasive and have excellent flame retardancy and low tinting strength in polyvinylchloride plastics.

These reaction products may be produced by calcining dry or wet blends of antimony trioxide and talc. Although there is little difference in end products produced by a process which uses dry blends as distinguished from a wet mixture, there may be instances where the addition of antimony trioxide and a talc to water to form an aqueous slurry has advantages from the standpoint of accelerating the formation of a homogenous mixture.

Where the compounds of antimony and hydrous magnesium silicate have been slurried in water the homogenous mixture is first filtered to produce a filter cake which dried, lightly milled and thereafter calcined at elevated temperatures to produce a reaction product.

While the weight ratio of antimony to talc is preferably about 1:3 on an anhydrous basis the concentration of antimony trioxide may be as low as about 15% to as high as about 55%. The lower concentration of antimony trioxide and in particular concentrations of about 20% give translucent polymers while reaction products containing antimany trioxide in amounts higher than about 55% tend to be more abrasive and to impart opacity to the polymers.

As in the case with hydrous calcium silicate the preferred calcination temperature for effecting the reaction between antimony trioxide and hydrous magnesium silicate in an atmosphere of air is about 475° C. When calcination temperatures are below about 400° C., the conversion of the respective compounds to an amorphous reaction product is incomplete while calcination temperatures above about 550° C. produce an abrasive product.

With regard to the use of hydrous silicas, it has been found that the reaction product produced by calcining a mixture of antimony trioxide and polysilicic acid comprises an antimony-containing composition of matter ideally suited as a flame retardant additive in plastics. Several different commercial polysilicic acids are available for this use. Mixtures of antimony trioxide and a polyhour to obtain a homogeneous mixture. The solids were filtered off and dried as a filter cake for 20 hours at 105° C. in a forced draft oven. The dried cake was ground in a mortar and pestle and calcined for 2 hours at 500° C. in an electric furnace. The calcined product was then hammer milled through an 0.020 inch screen. X-ray examination revealed that the product was amorphous and when added to polyvinylchloride and tested at 6 phr. for its flame retardancy the test strip had an oxygen index of 26.2 as compared to 25.3 for a test specimen containing no additive, was self-extinguishing by the Vertical test and the vinyl test strip was translucent.

EXAMPLE 5

To test the reaction product of this invention on a larger scale a typical plant run was made in which 300 gallons water were charged into a 900 gallon reaction tank and heated to about 49° C. to which were added 799 pounds hydrous calcium silicate (85.0% calcium silicate). The mixture was stirred for fifteen minutes during which time 40 gallons of additional water were added to thoroughly wet the silicate. 225 pounds of antimony trioxide were then added, the weight ratio of $Sb_2O_3$ to $CaO \cdot 3SiO_2$ being about 1:3; and stirring was continued until a homogeneous mixture was formed. The slurry, which comprises 24% solids, was pumped by a diaphragm pump to a rotary filter and the filter cake, comprising about 38% solids, was fed by a screw conveyor to a rotary gas-fired kiln in which the cake was calcined in an atmosphere of oxygen at about 550° C. The calciner discharge was ground in a micro-mill having an 0.02 inch screen.

The reaction product was essentially amorphous and when added to polyvinylchloride at 6 phr. gave an Oxygen Index rating of 26.5, was non-burning in the Vertical test and produced a substantially transparent vinyl plastic.

EXAMPLE 6

To prepare the reaction product of this invention using the dry blend technique 1184 grams hydrous calcium silicate (85.0% calcium silicate) and 334.0 grams antimony trioxide were thoroughly mixed in a Patterson Kelley Twin Shell blender equipped with an intensifier bar. The weight ratio of antimony trioxide to anhydrous $CaO \cdot 3SiO_2$ 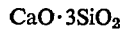

was about 1:3. 680 grams of the blended material were placed in a silica-quartz flask with an 8 x 8 cylindrical reaction zone. The flask was positioned in a Selas furnace and attached to a vacuum source so as to inspirate furnace gases across the tumbling powder. The furnace was heated by propane burners to bring the temperature of the solids in the flask to 500° C. in 58 minutes. When this temperature was reached the flask was removed from the furnace and allowed to cool. The reaction product was hammer-milled through an 0.03 inch screen. The reaction product was amorphous and when added to a vinyl plastic at 6 phr. the latter was substantially transparent.

EXAMPLE 7

Another series of tests were conducted using hydrous magnesium silicate as the source of silica. In these tests, 44 grams of antimony trioxide and 63.8 grams of laboratory prepared hydrous magnesium silicate (87.8% $MgO \cdot SiO_2$) 

dried at 105° C. were added to 175 milliliters water and the mixture stirred for one hour. The weight ratio of $Sb_2O_3$ to $MgO \cdot SiO_2$ was about 1:1.3. The solids were recovered by filtration and dried for 20 hours at 105° C. in a forced draft oven. The dried material was ground with mortar and pestle, placed in a clay dish and calcined for two hours at about 550° C. in an electric furnace in an atmosphere of air. The cooled reaction product was hammer milled through an 0.02 inch screen. The product comprised an amorphous material analyzing about 56% $MgO \cdot SiO_2$ and 44% $Sb_2O_3$ by weight. When incorporated in polyvinylchloride at 3.4 phr. and tested for flame retardancy the Oxygen Index reading was 27.2 and the test strip was non-burning by the Vertical test. The polyvinylchloride test strip was colorless and slightly hazy indicating that the product was non-abrasive and substantially completely reacted.

EXAMPLE 8

Another experiment was conducted in a manner similar to Example 7 except in this case 100.0 grams antimony trioxide and 409.4 grams of a commercial fibrous Montana talc, were slurried with 1500 milliliters water and stirred for one hour while raising the temperature from 24° C. to 40° C. The solids were recovered by filtration and dried for 20 hours at 105° C. in a forced draft oven. The dried material was then calcined for two (2) hours at 450° C. in an electric furnace. The calcined product comprised about 80% talc and 20% $Sb_2O_3$, was amorphous, substantially nonabrasive and when incorporated in a polyvinyl test strip at 6 phr. the latter was slightly hazy. The Oxygen Index was 27.6 and the specimen was self-extinguishing by the Vertical test.

EXAMPLE 9

53.9 grams of $Sb_2O_3$ and 146.1 grams of 100% barium metasilicate ($BaO \cdot SiO_2$) were added to 350 milliliters of water and the mixture was stirred for one hour. The weight ratio of antimony trioxide to $BaO \cdot SiO_2$ was 1:2.7. The solids were recovered by filtration and dried for 20 hours at 105° C. in a forced draft oven. The dried material was ground with mortar and pestle, placed in a clay dish, and calcined for two hours at 500° C. After cooling, the calcined material was hammer milled through an 0.02 inch screen. The product had a nominal composition of 27% $Sb_2O_3$ and 73% $BaO \cdot SiO_2$ by weight.

An X-ray examination of the reaction product showed th presence of some crystalline $Sb_2O_3$ and $BaO \cdot SiO_2$. The product was non-abrasive; and when incorporated in polyvinylchloride at 5.6 phr., the Oxygen Index level was 26.2 and the test strip was self-extinguishing by the Vertical test. The test strip was slightly hazy but not opaque.

EXAMPLE 10

48.75 grams of $Sb_2O_3$ and 117.2 grams of 86.3% strontium metasilicate ($SrO \cdot SiO_2$) were added to 350 milliliters of water and the mixture was stirred for one hour. The weight ratio of antimony trioxide to $SrO \cdot SiO_2$ was 1:2.1. The solids were recovered by filtration and dried for 20 hours at 105° C. in a forced draft oven. The dried material was ground with mortar and pestle, placed in a clay dish, and calcined for two hours at 500° C. After cooling, the calcined material was hammer milled through an 0.02 inch screen. The product had a nominal composition of 32.5% $Sb_2O_3$ and 67.5% $SrO \cdot SiO_2$ by weight.

The particulate reaction product was amorphous, non-abrasive and when added to polyvinylchloride at 4.6 phr. gave an Oxygen Index reading of 26.0 and was self-extinguishing by the Vertical Test. The test strip was slightly hazy.

EXAMPLE 11

25.0 grams of $Sb_2O_3$ and 75.8 grams of 99% potassium silicate ($K_2O \cdot 3.9SiO_2$) were placed in a 16 ounce jar and mixed by tumbling on rubber rollers for two hours. The weight ratio of antimony trioxide to $K_2O \cdot 3.9SiO_2$ was 1:3. The mixture was placed in a clay dish and calcined for two hours at 500° C. After cooling, the calcined material was hammer milled through an 0.02 inch screen. The product had a nominal composition of 25% $Sb_2O_3$ and 75% $K_2O \cdot 3.9SiO_2$. The product was mainly amorphous and when incorporated in a polyvinyl test strip at 6 phr. the latter was translucent.

silicic acid in a weight ratio of about 1:3 and calcined at about 450° C. form antimony-containing compositions of matter which are essentially wholly amorphous, non-abrasive, and when added to a polyvinyl plastic give unusually clear plastics with extremely low tinting strength and excellent flame retardancy.

As pointed out above the present invention is also comprehensive of other sources of hydrous alkali and alkaline earth metal silicates such as hydrous barium or hydrous strontium silicates; and other sources of antimony or antimony trioxide generating materials as for example organic and inorganic antimony salts such as antimony tartrate, antimony triacetate, antimony sulfide and antimony chloride. The production of the non-abrasive, particulate, antimony-containing composition of matter of this invention using combinations of the above identified source materials is further illustrated by the examples below.

TESTS

Abrasion

Particulate materials produced as herein described were tested for abrasiveness using a standard abrasion test for polyvinylchloride compounds wherein a polyvinylchloride resin (Geon 101, manufactured by B. F. Goodrich Company), and the additive (particulate reaction product) are mixed in an Oster Blender for 10 minutes at 7,200 r.p.m. Plasticizers and stabilizers (when needed) are added and the compounds are milled for four minutes at 305° F. A 40 mil specimen is then molded at 300° F. for five minutes. Thereafter, the specimen is examined for graying. If no graying is observed the additive is non-abrasive. Severity of abrasion is measured by the intensity of graying. The following formulation is used:

Geon 101 (B. F. Goodrich Chemical Co.) __parts__ 100
Additive (particulate reaction product) ____phr*__ 5
Clarite NS–2 (di-butyltin maleate stabilizer) __phr__ 1.5
DOP (dioctylphthalate) _____phr__ 50

*Parts additive per 100 parts resin.

Clarity

To test the completeness of the reaction between the compound of antimony and the hydrous compound of silicon reaction product was subjected to a clarity test wherein a test sheet of the following formulation is prepared:

Geon 101 EP (B. F. Goodrich Chemical Co.)
parts__ 100
DOP (dioctylphthalate) _____phr__ 50
Clarite NS–2 (di-butyltin maleate stabilizer) __phr__ 1.5
Stearic acid _____phr__ 0.25
Additive (particulate reaction product) _____phr__ 6.0

The constituents were milled at 305° F. for four minutes and molded at 325° F. for five minutes at 6,000 p.s.i. A cooled test strip of about 20 mil thickness cut from the test sheet was mounted on a BWS hiding power chart and examined for clarity. If the reaction product had reated completely, or substantially so, the test strip would be clear or at least translucent. If not substantially completely reacted the test sheet would be hazy or opaque.

Flame retardancy

The tests used for determining the effectiveness of the antimony containing composition of matter as a flame retardant in plastics were: ASTM D–2863 (Oxygen Index test); ASTM D–635 (Horizontal test); and ASTM D–568 (Vertical test). Typical plastics used for these evaluations were: plasticized polyvinylchloride (PVC), acrylonitrile-butadiene-styrene terpolymer (ABS) and styrenated polyester resin systems.

EXAMPLE 1

500 grams antimony trioxide and 1,764 grams hydrous calcium silicate (85.0% calcium silicate) in a weight ratio of $Sb_2O_3:CaO \cdot 3SiO_2$ of about 1:3 were added to a mixing vessel and stirred with 6,000 milliliters water at ambient temperature for about one hour at which time a homogenous mixture was formed comprising about 25% solids. The slurry was filtered and the solids were recovered as a filter cake which was dried by heating in a forced draft oven for 20 hours at 105° C. The dried cake was ground with mortar and pestle and was then calcined for 2 hours at 500° C. in an electric furnace in an air atmosphere. The calcined product was then hammer milled through an 0.020 inch screen.

The particulate reaction product was essentially amorphous, non-abrasive and analyzed about 25% antimony trioxide and about 75% calcium silicate.

When added to polyvinylchloride at 6 phr. and tested for its flame retardancy using the Oxygen Index test the rating was 26.5 as compared to 25.3 for a test specimen containing no additive; while the Vertical test showed the polymer containing the additive to be non-burning. The vinyl test strip was translucent indicating that the compound was substantially completely reacted.

EXAMPLE 2

116.0 grams hydrous calcium silicate (85.0% calcium silicate) and 29.15 grams antimony trioxide in a weight ratio of $Sb_2O_3:CaO.3SiO_2$ of about 1:3.4 were added to a mixing vessel and thoroughly stirred with 450 milliliters water until a homogenous mixture was formed. The solids were filtered off as described in Example 1 and the resulting filter cake was dried in a forced draft oven at 105° C. for 20 hours. The dried cake was ground with mortar and pestle. Two portions of the powdered material were calcined for 2 hours at 500° C. and 750° C., respectively, in an electric furnace in an air atmosphere. The products were hammer milled through an 0.02 inch screen. Both products had approximately the same composition i.e. about 23.0 $Sb_2O_3$ and 77.0 calcium silicate. However, the particulate product calcined at 500° C., was amorphous and non-abrasive while the particulate product calcined at 750° C. was principally crystalline $Sb_2O_5$. Moreover, when tested for flame retardancy in polyvinylchloride at 6 phr. the product calcined at 500° C. had an Oxygen Index rating of 26.2, was self-extinguishing by the Vertical test and produced a substantially translucent vinyl test strip indicative of substantially complete reaction of the respective compounds. In contradistinction the product calcined at 750° C., showed the presence of crystalline $Sb_2O_5$, was abrasive, gave a relatively low Oxygen Index rating of 25.4, and produced an opaque vinyl test strip.

EXAMPLE 3

58.0 grams antimony trioxide and 232.3 grams hydrous calcium silicate (85.0% calcium silicate) in a weight ratio of $Sb_2O_3:CaCo \cdot 3SiO_2$ of 1:3.4 were slurried in 900 milliliters water and the slurry dried and ground as in Example 1. One portion of the ground powder was then calcined for 2 hours at 400° C. and a second portion calcined at 450° C. in an electric furnace. The screened products contained 23% $SB_2O_3$ and 77% $CaO \cdot 3SiO_2$ and were non-abrasive. The particulate reaction product formed at 400° C. was X-rayed and showed the presence of crystalline fractions comprising $Sb_2O_3$ and $Sb_2O_4$; and when added to a polyvinyl test strip rendered the latter opaque showing that the constitutents had not completely reacted at this relatively low temperature. On the other hand the product formed at 450° C. was substantially wholly amorphous and when added to polyvinyl chloride at 6 phr. had an Oxygen Index of 26.5, was self-extinguishing by the Vertical test and rendered the test strip only slightly hazy.

EXAMPLE 4

30 grams antimony trioxide and 141.1 grams hydrous calcium silicate (85.0% calcium silicate) in a weight ratio of $Sb_2O_3:CaO \cdot 3SiO_2$ of 1:4 were slurried in 500 ml. water at ambient temperature and stirred for one

EXAMPLE 12

In still another test, 25 grams of $Sb_2O_3$ were added with stirring to 1834 grams of a polysilicic acid solution (4.1% $SiO_2$) in a weight ratio of about 1:3 $Sb_2O_3:SiO_2$. The silica was precipitated by the addition of one milliliter of 29% aqueous ammonia and the jelled slurry was stirred for one hour. The solids were removed by filtration and dried for twenty hours in a forced draft oven at 105° C. The dried material was then placed in a clay dish and calcined for two hours at 450° C. in an electric furnace. The cooled sample was hammer-milled through an 0.02 inch screen.

X-ray examination showed the reaction product to be completely amorphous and when incorporated in polyvinylchloride at 6 phr. the latter was colorless and very slightly hazy.

EXAMPLE 13

(a) 50 grams antimony trioxide and 170 grams commercial hydrous silica (88.2% $SiO_2$) in a weight ratio of $Sb_2O_3:SiO_2$ of 1:3 were slurried in one liter of water at ambient temperature and stirred for 30 minutes to obtain a homogenous mixture. The solids were recovered for filtration and the filter cake was dried for 20 hours at 105° C. in a forced draft oven. The dried cake was ground in a mortar and was then calcined for 2 hours in an electric furnace at 450° C. The calcined product was hammer-milled through an 0.020 inch screen.

Specific gravity: 2.47
Refractive index: 1.51 to 1.52 (diffuse refraction)

When added to polyvinylchloride at 6 phr. and tested for its flame retardancy the test strip had an Oxygen Index of 27.3 as compared to 25.2 for a test specimen containing no additive. The vinyl test strip was translucent.

(b) 100 grams antimony trioxide and 113.4 grams commercial hydrous silica (88.2% $SiO_2$) in a weight ratio of $Sb_2O_3:SiO_2$ of 1:1 were slurried in one liter of water at ambient temperature and stirred for 30 minutes to obtain a homogeneous mixture. The solids were recovered by filtration and the filter cake was dried for 20 hours at 105° C. in a forced draft oven. The dried cake was ground in a mortar and was then calcined for 2 hours in an electric furnace at 450° C. The calcined product was hammer milled through an 0.020 inch screen.

Specific gravity: 3.23
Refractive index 1.5 to 1.7 (diffuse refraction)

When added to polyvinylchloride at 6 phr. and tested for its flame retardancy the test strip had an oxygen index of 28.2 as compared with 25.2 for a test specimen containing no additive. The vinyl strip was translucent.

EXAMPLE 14

As mentioned above the invention also contemplates other sources of antimony including organic and inorganic salts. In Example 14, 110.3 grams hydrous calcium silicate (85% $caO \cdot 3SiO_2$) and 85.3 grams of antimony tartrate hexahydrate were placed in a one quart jar and mixed by tumbling for two hours. The mixture was placed in a clay dish and calcined for two hours at 500° C. in an electric furnace. The product had a nominal weight ratio of 1:3 generated $Sb_2O_3:CaO \cdot 3SiO_2$. The cooled sample was hammer milled through an 0.02 inch screen. The reaction product was amorphous, non-abrasive, and when incorporated in polyvinylchloride the latter was colorless and translucent. The Oxygen Index of the test strip was 25.7.

EXAMPLES 15 AND 16

Two additional tests were made using in the one case potassium antimony tartrate and in the other antimony trisulphide. In Example 15, 110.35 grams of hydrous calcium silicate (85% $CaO \cdot 3SiO_2$) and 71.6 grams of potassium antimony tartrate were placed in a one quart jar and mixed by tumbling for two hours. The mixture was transferred to a clay dish and calcined for two hours at 500° C. in an electric furnace. The product had a nominal weight ratio of 1:3 generated $Sb_2O_3:CaO \cdot 3SiO_2$. The cooled sample was hammer milled through an 0.02 inch screen. The reaction product was amorphous, non-abrasive, and when incorporated in polyvinylchloride at 6 phr. the latter was colorless and translucent. The Oxygen Index of the test speciment was 25.7.

Example 16 was carried out by placing 66.12 grams hydrous calcium silicate (85% $CaO \cdot 3SiO_2$) and 21.85 grams of antimony trisulphide in a 16 ounce jar and mixing the compounds by tumbling for four hours. The mixed sample was placed in a porcelain boat and calcined for three hours at 500° C. in a tube furnace with air flowing over the material at the rate of 16 cubic feet per hour. The calcined material was powdered by crushing with mortar and pestle. The product had a nominal weight ratio of about 1:3 generated $Sb_2O_3 \cdot CaO \cdot 3SiO_2$.

The reaction product was amorphous and non-abrasive and the vinyl test strip was translucent.

Controls

With each of the several examples described above comparative tests were made using $Sb_2O_3$ and the $Sb_2O_3$ coated silica-core pigment of the aforementioned patent U.S. 2,882,178.

When antimony trioxide was incorporated in polyvinylchloride its fire retardancy was about 27.4 by the Oxygen Index test and it was self-extinguishing by the Vertical test. However, the polyvinylchloride test sheet was opaque.

The antimony trioxide coated silica-core pigments were prepared as described in the aforesaid patent. The reaction product was very abrasive and when incorporated in polyvinylchloride the Oxygen Index was about 27.1 and the test strip was self-extinguishing by the Vertical test. However, the polyvinylchloride test strip was cream color and the strip was opaque.

EXAMPLE 17

The composition of matter of this invention acts as a flame retardant in polymers other than polyvinylchloride. In particular it has been demonstrated that it is effective in acrylonitrile - butadiene - styrene - terpolymer (ABS). Thus, when the reaction product produced in accordance with Example 8 above, was added to ABS terpolymer and tested for its flame retardancy using the Oxygen Index Test the rating was 25.6 as compared to 21.6 when the additive was omitted. In addition when the specimen was tested in the ASTM D-635-63 test it was rated "non-burning" compared with a similar specimen containing no additive which was rated "burning." In these tests the halogen source used was Dechlorane 604 (product of Hooker Chemical Company).

EXAMPLE 18

In still another polymer system the composition of matter of this invention also demonstrated flame retardant properties. In particular it has been demonstrated that it is effective in a styrenated polyester resin system. Thus, when the reaction product produced in accordance with Example 8, above, was added to the polyester system and tested for its flame retardancy using the Oxygen Index Test, the rating was 25.4 as compared to 20.5 when the additive was omitted. In addition when the specimen was tested in the ASTM-D-635-63 test it was rated "non-burning" compared with a similar specimen containing no additive which was rated "burning." In the aforementioned tests the halogen source was Chlorowax 70 (Diamond Shamrock Company).

EXAMPLE 19

As mentioned above the composition of matter of this invention has other uses than as a flame retardant in plastics. In particular it has been shown that it is effective as a catalyst for polymerization of monomers. Thus using as a monomer a bis (2-hydroxy ethyl) terephthalate, 250 grams of the monomer where added to a stainless steel resin kettle. To the monomer were added 0.482 gram of the reaction product produced in accordance with Example 7 above, and 0.147 gram of tris nonyl phenyl phosphate. The system was sealed and agitated for a period of 4.5 hours under vacuum (less than 0.1 mm.) at 285° C. to 295° C. The system was agitated using an air motor. The polymer was removed, ground in a Wiley Mill and analyzed for COOH end groups. Found 35.0 equivalents/ $10^6$ grams polymer which was gray in color.

From the foregoing description and examples it will be apparent that by calcining homogenous mixtures of hydrous silica or hydrous alkali and alkaline earth metal silicates and antimony trioxides or antimony trioxide generating compounds in a critical weight ratio, within a critical temperature range and in an oxygen containing atmosphere a reaction product will be produced which is essentially a substantially white particulate material which may be wholly or partially amorphous, which is non-abrasive, and when incorporated in a plastic material imparts good flame retardancy while maintaining its translucency. Moreover, the reaction product of this invention is also useful as a catalyst in the polymerization of monomers.

We claim:

1. A substantially translucent polyvinylchloride plastic composition possessing enhanced flame retardancy consisting essentially of a polyvinylchloride plastic having dispersed therein an amorphous, non-abrasive, fire retardant antimony containing inorganic composition of matter comprising the reaction product of a compound of antimony and a substrate comprising a hydrous compound of silicon in a weight ratio of from 1:4 to 1:1 on an antimony trioxide:substrate basis, said reaction product being substantially free of antimony tetroxide and comprising a particulate solid having a specific gravity of from 2.4 to 3.6 and an index of refraction of from 1.5 to 1.7.

2. In a method for producing a substantially translucent polyvinylchloride plastic composition having enhanced flame retardancy the steps comprising: adding to said polyvinylchloride plastic an amorphous, non-abrasive, fire retardant antimony containing inorganic composition of matter comprising the reaction product of a compound of antimony and a substrate comprising a hydrous compound of silicon in a weight ratio in the range of from 1:4 to 1:1 on an antimony trioxide:substrate basis, said reaction product being substantially free of antimony tetroxide and having a specific gravity of from 2.4 to 3.6 and an index or refraction of from 1.5 to 1.77 and thoroughly admixing said antimony containing inorganic composition of matter into said plastic.

References Cited
UNITED STATES PATENTS

| | | | |
|---|---|---|---|
| 3,560,441 | 2/1971 | Schwarcz et al. | 106—15 FP |
| 2,882,178 | 4/1959 | Dunn et al. | 106—303 |

MORRIS LIEBMAN, Primary Examiner

S. L. FOX, Assistant Examiner

U.S. Cl. X.R.

106—15 FP; 252—8.1; 260—42.49